United States Patent
Iyigun et al.

(10) Patent No.: US 10,268,487 B2
(45) Date of Patent: Apr. 23, 2019

(54) FAST COMPUTER STARTUP

(71) Applicant: MICROSOFT TECHNOLOGY LICENSING, LLC, Redmond, WA (US)

(72) Inventors: Mehmet Iyigun, Kirkland, WA (US); Yevgeniy Bak, Redmond, WA (US); Emily N. Wilson, Seattle, WA (US); Kirsten V. Stark, Seattle, WA (US); Sushu Zhang, Tempe, AZ (US); Patrick L. Stemen, Seattle, WA (US); Brian E. King, Bothell, WA (US); Vasilios Karagounis, Sammamish, WA (US); Neel Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/214,383

(22) Filed: Jul. 19, 2016

(65) Prior Publication Data
US 2016/0328243 A1  Nov. 10, 2016

Related U.S. Application Data

(63) Continuation of application No. 14/011,624, filed on Aug. 27, 2013, now Pat. No. 9,411,607, which is a
(Continued)

(51) Int. Cl.
*G06F 1/32* (2006.01)
*G06F 9/4401* (2018.01)

(52) U.S. Cl.
CPC .......... *G06F 9/4418* (2013.01); *G06F 9/4406* (2013.01); *G06F 9/4411* (2013.01)

(58) Field of Classification Search
None
See application file for complete search history.

(56) References Cited

U.S. PATENT DOCUMENTS 5,586,334 A  12/1996  Miyazaki
5,696,897 A  12/1997  Dong
(Continued)

FOREIGN PATENT DOCUMENTS

CN    1467625      1/2004
CN    101356501 A  1/2009
(Continued)

OTHER PUBLICATIONS

Australian Patent Office, Author unknown, AU Notice of Acceptance for Application No. 2010365029, 3 pages, dated Jul. 14, 2016, Australia.
(Continued)

*Primary Examiner* — Paul B Yanchus, III
(74) *Attorney, Agent, or Firm* — The Watson I.P. Group, PLC; Vladan M. Vasiljevic

(57) ABSTRACT

Fast computer startup is provided by, upon receipt of a shutdown command, recording state information representing a target state. In this target state, the computing device may have closed all user sessions, such that no user state information is included in the target state. However, the operating system may still be executing. In response to a command to startup the computer, this target state may be quickly reestablished from the recorded target state information. Portions of a startup sequence may be performed to complete the startup process, including establishing user state. To protect user expectations despite changes in response to a shutdown command, creation and use of the file holding the recorded state information may be conditional on dynamically determined events. Also, user and programmatic interfaces may provide options to override creation or use of the recorded state information.

20 Claims, 8 Drawing Sheets

Related U.S. Application Data continuation of application No. 12/961,275, filed on Dec. 6, 2010, now Pat. No. 8,543,849.

(56) References Cited

U.S. PATENT DOCUMENTS

| | | | |
|---|---|---|---|
| 5,974,552 | A | 10/1999 | Lim |
| 5,978,922 | A | 11/1999 | Arai |
| 6,115,824 | A | 9/2000 | Ha |
| 6,209,088 | B1 | 3/2001 | Reneris |
| 6,564,286 | B2 | 5/2003 | DaCosta |
| 6,609,182 | B1 | 8/2003 | Pedrizetti |
| 6,636,963 | B1 | 10/2003 | Stein |
| 7,131,011 | B2 | 10/2006 | Westerinen et al. |
| 7,356,677 | B1 | 4/2008 | Rafizadeh |
| 8,543,839 | B2 | 9/2013 | Sibert |
| 8,543,849 | B2 | 9/2013 | Iyigun et al. |
| 8,675,926 | B2 | 3/2014 | Zhang et al. |
| 8,788,798 | B2 | 7/2014 | Iyigun |
| 9,032,194 | B2 | 5/2015 | Iyigun et al. |
| 9,141,371 | B1 | 9/2015 | Feeser |
| 9,348,606 | B2 | 5/2016 | Iyigun et al. |
| 9,361,128 | B2 | 6/2016 | Iyigun et al. |
| 9,411,607 | B2 * | 8/2016 | Iyigun ............ G06F 9/4418 |
| 10,061,595 | B2 | 8/2018 | Iyigun et al. |
| 2001/0039612 | A1 | 11/2001 | Lee |
| 2002/0188838 | A1 | 12/2002 | Welder |
| 2004/0236974 | A1 | 11/2004 | Brown |
| 2005/0085222 | A1 | 4/2005 | Przybilski |
| 2005/0086551 | A1 | 4/2005 | Wirasinghe |
| 2005/0094203 | A1 | 5/2005 | Rodriguez et al. |
| 2005/0160162 | A1 | 7/2005 | Cromer |
| 2005/0223209 | A1 | 10/2005 | Chang |
| 2006/0069696 | A1 | 3/2006 | Becker et al. |
| 2006/0085630 | A1 | 4/2006 | Challener |
| 2006/0149956 | A1 | 7/2006 | Chang |
| 2006/0242398 | A1 | 10/2006 | Fontjin |
| 2006/0265437 | A1 | 11/2006 | Coulson |
| 2006/0282654 | A1 | 12/2006 | Veen |
| 2007/0032228 | A1 | 2/2007 | Varanda |
| 2007/0083746 | A1 | 4/2007 | Fallon |
| 2007/0101077 | A1 | 5/2007 | Evanchik |
| 2007/0233947 | A1 | 10/2007 | Coulson et al. |
| 2007/0234356 | A1 | 10/2007 | Martins |
| 2007/0260867 | A1 | 11/2007 | Ethier |
| 2007/0277051 | A1 | 11/2007 | Reece et al. |
| 2008/0154805 | A1 | 6/2008 | Gurumoorthy |
| 2009/0037722 | A1 | 2/2009 | Chong |
| 2009/0100516 | A1 | 4/2009 | Ray |
| 2009/0157960 | A1 | 6/2009 | Koga |
| 2009/0164819 | A1 | 6/2009 | Berger |
| 2009/0217026 | A1 | 8/2009 | Chuang et al. |
| 2009/0265348 | A1 | 10/2009 | Elteto |
| 2009/0303097 | A1 | 12/2009 | Reams et al. |
| 2010/0058041 | A1 | 3/2010 | John |
| 2010/0064126 | A1 | 3/2010 | Yi |
| 2010/0100719 | A1 | 4/2010 | Chen |
| 2010/0281474 | A1 | 11/2010 | Eason |
| 2010/0325622 | A1 | 12/2010 | Morton |
| 2012/0144177 | A1 | 6/2012 | Iyigun |
| 2012/0144178 | A1 | 6/2012 | Iyigun |
| 2012/0144179 | A1 | 6/2012 | Iyigun |
| 2014/0331035 | A1 | 11/2014 | Iyigun et al. |
| 2015/0234666 | A1 | 8/2015 | Iyigun et al. |
| 2016/0232009 | A1 | 8/2016 | Iyigun et al. |
| 2016/0253184 | A1 | 9/2016 | Iyigun et al. |

FOREIGN PATENT DOCUMENTS

| | | |
|---|---|---|
| EP | 0842469 B1 | 2/2002 |
| EP | 1 755 038 A1 | 2/2007 |
| JP | H04362718 A | 12/1992 |
| JP | 09-237128 A | 9/1997 |
| JP | 2004-362426 A | 12/2004 |
| JP | 2006-277472 A | 10/2006 |
| JP | 2008-165552 | 7/2008 |
| JP | 2009-146061 A | 7/2009 |
| JP | 2009-276887 A | 11/2009 |
| JP | 2010-123125 A | 6/2010 |
| RU | 2182375 C2 | 5/2002 |
| TW | 200937177 A | 9/2009 |
| TW | 200943046 A | 10/2009 |
| WO | 2007/056436 | 5/2007 |

OTHER PUBLICATIONS

Korean Intellectual Property Office, KR Preliminary Rejection for Application No. 10-2013-7014522, p. 1, dated Apr. 29, 2016, Korea.
Chinese State Intellectual Property Office, Author unknown, CN Notification to Grant Patent Right for Invention for Application No. 201110400512.3, pp. 1-2, dated May 4, 2016, China.
Taiwan Patent Office, Author unknown, TW Office Action for Application No. 99145833, pp. 1-2, dated Nov. 30, 2015, Taiwan.
Russian Patent Office, Author unknown, RU Office Action for Application No. 2013125951, 1 page, dated Jan. 30, 2015, Russia.
Canadian Intellectual Property Office, CA Examiner's Report for Application No. 2,817,196, 3 pages, dated Oct. 21, 2016, Canada.
Canadian Intellectual Property Office, CA Examiner's Report for Application No. 2,817,196, dated Apr. 26, 2017, 3 pages, Canada.
Japanese Patent Office, JP Notice of Allowance for Application No. 2013-543148, p. 1, dated Mar. 12, 2015, Japan.
Chinese State Intellectual Property Office, Author unknown, CN Notice on Grant of Patent Right for Invention for Application No. 201110418183.5, pp. 1-2, dated Feb. 3, 2015, China.
Chinese State Intellectual Property Office, Author unknown, CN Notification to Grant Patent Right for Invention for Application No. 201110400473.7, pp. 1-2, dated Dec. 3, 2014, China.
Japanese Patent Office, JP Notice of Allowance for Application No. 2013-543228, dated Apr. 12, 2016, p. 1, Japan.
U.S. Appl. No. 12/961,275, filed Dec. 6, 2010, Iyigun.
U.S. Appl. No. 14/011,624, filed Aug. 27, 2013, Iyigun.
U.S. Appl. No. 12/960,835, filed Dec. 6, 2010, Iyigun.
U.S. Appl. No. 14/702,412, filed May 1, 2015, Iyigun.
U.S. Appl. No. 15/131,353, filed Apr. 18, 2016, Iyigun.
U.S. Appl. No. 12/961,318, filed Dec. 6, 2010, Iyigun.
U.S. Appl. No. 14/333,946, filed Jul. 17, 2014, Iyigun.
U.S. Appl. No. 15/152,324, filed May 11, 2016, Iyigun.
AU Patent Examination Report No. 1 for Application No. 2010365029, Reference 352025381DBW, dated Mar. 22, 2016.
CN Fourth Office Action for Application No. 201110400512.3, dated Feb. 2, 2016.
JP Notice of Reason for Rejection for Application No. 2013-543228, dated Dec. 8, 2015.
CN Reexamination Decision for Application No. 201110400512.3, dated Nov. 9, 2015.
TW Search Report for Application No. 099145833, dated Aug. 25, 2015.
Oracle, "Oracle VM Virtual Box", Published on or Before 2004.
RU Decision on Grant of a Patent for Invention for Application No. 2013125951/08(038369), dated Jun. 23, 2015.
TW Search Report for Application No. 099145833, dated Mar. 10, 2015.
CN Second Office Action for Application No. 201110400473.7, dated Jul. 10, 2014.
CN Decision on Rejection for Application No. 201110400512.3, dated Dec. 2, 2014.
EP Communication for Application No. 10860471.1-1954/2649517, Reference M11255EP, dated Jan. 15, 2015.
JP Notice of Reason for Rejection for Application No. 2013-543148, dated Nov. 28, 2014.
CN Notice on the Third Office Action for Application No. 201110418183.5, dated Oct. 8, 2014.
CN Third Office Action for Application No. 201110400512.3, dated Jul. 11, 2014.
CN Second Office Action for Application No. 201110400512.3, dated Apr. 15, 2014.
CN Notice on the Second Office Action for Application No. 201110418183.5, dated Apr. 30, 2014.

(56) References Cited

OTHER PUBLICATIONS

CN First Office Action and Search Report for Application No. 201110400473.7, dated Jan. 28, 2014.
CN Search Report for Application No. 201110400512.3, dated Oct. 24, 2013.
CN Notice on the First Office Action for Application No. 201110418183.5, dated Nov. 11, 2013.
Diskeeper Corporation—Published Date: Aug. 18, 2009. http://www.diskeeper.com/blog/categoryfHyperBoot.aspx.
ASRock "4 second" Instant Boot for Windows—Published Date: Nov. 13, 2008. http://www.z.d net com/blog/hardware/asrock-4-second-instant-boot-for-windows/3012.
Linea Solutions, Inc., pp. 1-3, Retrieved Dec. 6, 2010. http://wwvv.lineo.co.jp/modules/products/products-services/products/warp2.html.
PCT International Search Report and Written Opinion for Application No. PCT/US2010/061180. dated Nov. 29, 2011.
Iyigun, "Fast Computer Startup", U.S. Appl. No. 12/961,318, filed Dec. 6, 2010.
Iyigun, "Fast Computer Startup", U.S. Appl. No. 12/960,835, filed Dec. 6, 2010.
PCT International Search Report and Written Opinion for Application No. PCT/US2011/06320S, dated Jun. 1, 2012.
Karagounis, "Optimizing for Fast Startup and Energy Efficiency", Windows Planning Survey, Apr. 13, 2010.
Korean Intellectual Property Office, Author unknown, KR Notice of Allowance for Application No. 10-2013-7014522, p. 1, dated Oct. 30, 2016, Korea.
"Office Action Issued in European Patent Application 10860471.1", dated Jul. 11, 2017, 4 Pages.

\* cited by examiner

FAST COMPUTER STARTUP

RELATED APPLICATIONS

This Application is a Continuation of and claims benefit from U.S. patent application Ser. No. 14/011,624 that was filed Aug. 27, 2013, and that is a Continuation of U.S. patent application Ser. No. 12/961,275 (U.S. Pat. No. 8,543,849), filed Dec. 6, 2010 (issued Sep. 24, 2013), each of which is incorporated herein by reference in its entirety.

BACKGROUND

Computers have several operating modes, ranging from full operation to full shutdown. In full operation, software defining the executing portions of the operating system has been loaded from non-volatile memory into volatile memory, from which it can more quickly be executed. The computer enters this full operation mode though a "startup" process. The startup process configures the hardware and loads the operating system of the computer. As part of the startup process, drivers are installed and operating system services are started.

Once the computer is ready for operation by any user, a user may log on to the computer. This log on may involve further configuration of the computer based on a profile specific to user who is logged on. Either automatically or in response to user input, applications may then be loaded, such that the applications can execute, taking advantage of the capabilities of the hardware and operating system services of the computing device.

In the process of loading software, whether for the operating system or applications, memory may be allocated, parameters of the software may be assigned values based on the hardware configuration of the computer or a user profile, and other configuration actions may be performed.

These actions establish a "state" of the computing device. Further changes to the memory and other parameters of the system that define its operating state may also be made as the user provides commands to interact with executing applications or operating system services.

In full shutdown mode, power is not supplied to the hardware components of the computer. No software or state information is stored in volatile memory, as this memory does not retain information when it is powered off. Rather, any information that will be used later to re-configure the computer for a full operation mode is stored in non-volatile memory.

The computer enters shutdown mode through a process called shutdown. During shutdown, any information that may be needed to re-configure the computer, if it is not already stored in non-volatile memory, may be stored in non-volatile memory. Software and other configuration information that was copied into volatile memory from non-volatile memory is not copied back to non-volatile memory, because it can be re-created upon a subsequent startup process. However, to the extent that the volatile memory caches data copied from non-volatile memory that was modified after it was copied (sometimes called "dirty" data), that data is copied to non-volatile memory during shutdown.

A further variation is called log off. In a computer that supports user sessions, users may log on to the computer in order to access its functionality. Though shutdown effectively logs off users, a separate log off process may be performed following which the computer does not power down. Rather, the operating system remains loaded and ready for another user to log on. During logoff, the computer "breaks down" user sessions. Breaking down a user session may entail closing applications launched by the user and storing user specific data not already in non-volatile memory.

In addition to a full shutdown or log off, there may be power saving modes in which power to some or all of the hardware components of the computer is turned off. In a power saving mode, sometime called sleep mode, power is turned off for the computer processor, network interfaces and possibly other components. However, power is retained for volatile memory. In this way, any state information created during boot or subsequent operation of the computer is retained in volatile memory. When power is supplied to the processor again, it may resume operation in the state where it left off upon entering sleep mode.

A further mode is sometimes called hibernate mode. The computer enters this mode through a process called hibernation. During hibernation, a file capturing the operating state of the computer is created and stored in non-volatile memory, typically a hard disk. During a process of resuming from hibernate, this file may be read from the disk and used to re-establish the state of the computer as it existed at the time of hibernation. Resuming from hibernate restores in volatile memory copies of software or parameters set during operation that existed at the time of hibernating, such that any user state is also restored.

Resuming from hibernation can be faster than performing a full startup for several reasons. One reason is that copying the state information in the hibernation file into volatile memory re-creates the results of the full startup process, while avoiding the time spent executing the steps of the startup process, such as CPU consumption, device initialization and many other types of work that has to be done during boot. Additionally, the information accessed during startup is stored in many different files, representing different components that are accessed to load and configure what may be potentially tens of thousands of components in the operating system. These components, and the information accessed to configure them, may be randomly distributed across the hard disk. Because hard disk drives, and some other forms of high capacity storage, are most efficient at accessing sequential data, accessing randomly distributed data may include substantial disk access time, leading to a long startup process. In contrast, the access time is less in reading the hibernation file because information in that file may be stored sequentially on the disk.

A further difference between resuming from hibernation and startup is that hibernating and then resuming restores the full state of the computer, including any user state for the user of the computer at the time the computer hibernated. In contrast, until a user logs on, a startup will generically configure a computer for any user. Specific users may then log on or otherwise take action to configure the computer for themselves. For this reason, hibernation is generally selected by a user who intends to be away from a computer for a while, but intends to return to the computer. A shutdown is generally used by a user who intends to be away from the computer for a longer time, possibly not returning to the computer at all or who expects other users may use the computer in the before the user returns.

SUMMARY

To improve a user experience, a computer may be configured to respond to a user command to shutdown by entering hibernate mode. Such a computer may be ready for operation by a user more quickly after the user provides a command to startup the computer. To enable the computer to quickly be ready for operation in a state consistent with a user's expectation, a hibernation file captures a target state that implements user expectations. In response to a shutdown command, the computer creates this target state prior to hibernating by performing only a portion of the steps in a shutdown process. The steps performed may place the computer in the target state, corresponding to a state in which the operating system remains loaded, but user sessions have been broken down.

Upon receipt of a startup command, the computer system may, rather than creating an operating state by loading and configuring software, re-create the target state by copying the hibernation file into volatile memory. The computer then may perform only portions of the startup sequence. Those portions may include the operations that would conventionally occur during a startup sequence after the operating system is loaded. Those steps may include, for example, interacting with a user to perform a user log on and load applications that define a user state.

In some embodiments, conditional processing may be performed in response to a user command indicating a shutdown. The computing device may determine, for example, whether the computing device is in an operating state where a full shutdown is required or whether creating a hibernation file to use in response to a subsequent startup command is appropriate.

Such a state may be identified in any of a number of ways, including by determining that configuration settings of some installed component were changed and will not be applied until the component again is loaded as part of a full startup sequence. Alternatively, a programming interface may be provided that allows application components to register as requiring a full shutdown.

If such a condition is detected, conventional shutdown processing may be performed until the computing device is fully powered down. If not, the shutdown sequence may be performed until the computing device is in the target state, from which a hibernation file may be made.

In some embodiments, conditional processing may be performed in response to a user command to startup. That conditional processing may include determining whether a hibernation file exists. If so, a further check may be made on whether it is possible that the target state of the computing device could have changed between the time when the hibernation file was created and the time at which the startup command was received. If events that could have caused a change in state are detected, the computing device may perform a full startup sequence.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
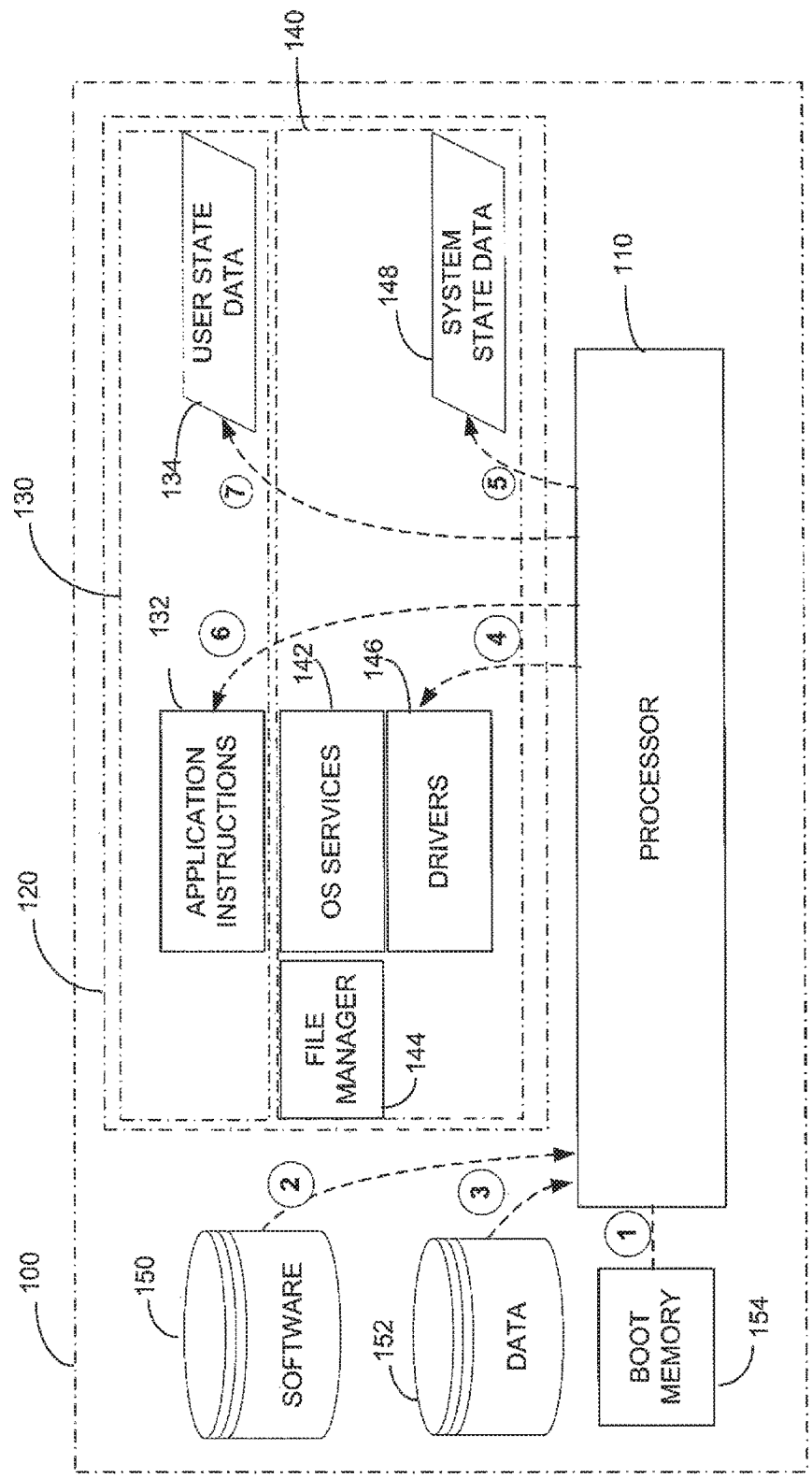
FIG. 1 is a conceptual block diagram illustrating a startup sequence in a computing device.

The inventors have recognized and appreciated that an experience of a user of a computing device may be improved through the use of a hibernation file in conjunction with portions of a shutdown and/or startup sequence of the computing device. Such a file may be created selectively upon shutdown and used selectively upon startup such that the performance of the computing device matches user expectations. Even when a hibernation file is created or used, portions of conventional shutdown or startup sequences may be performed.

To provide operation of the computing device that is consistent with user expectations, hibernation may be used in conjunction with portions of a traditional shutdown sequence of the computing device that places the computing device in a target state. Those portions may include, upon receipt of a shutdown command, operations that break down user sessions. In addition, as part of responding to a shutdown command, information retained in volatile memory after user sessions are broken down, but that is intended to be retained in non-volatile memory is moved to non-volatile memory. For example, traditional cache flushing operations that mimic those performed during a conventional shutdown may be performed.

Conversely, upon processing of a startup command, a resume from hibernation may be performed along with portions of a startup sequence. That sequence may include any part of the startup sequence that occurs after the operating system is loaded and ready for operation. That part of the startup sequence may include user log on and loading of applications, for example.

Further, to provide operation consistent with user expectations, creation or use of a hibernation file as part of shutdown or startup may be conditioned upon dynamically determined events. In scenarios in which a component has been reconfigured during an operating session, such that configuration changes are not applied until the next time the component is loaded, no hibernation file may be created. In response to the next startup command from a user, the computer will detect that no hibernation file is available and create the target state by reloading the operating system. Alternatively or additionally, the operating system may provide an interface through which other components can register to signify that they require a full shutdown or startup to function effectively. When executing components are registered, a full shutdown sequence may be performed in response to a shutdown command.

Further, to operate consistently with user expectations, in some embodiments, a user interface may be provided through which a user may specify whether to perform a conventional shutdown or a modified shutdown in which a target state is created and then the hibernation process is performed. Such a user interface may present separate options for a conventional shutdown and a modified shutdown sequence incorporating hibernation. A computing device may conditionally invoke the modified shutdown sequence in response to an input labeled as a conventional shutdown command. A separate command option may be provided through the interface with which a user may specify a conventional shutdown.

Turning now to FIG. 1, a function block diagram of a fall startup sequence is illustrated. FIG. 1 illustrates a functional block diagram of a computing device 100 that may be adapted to operate according to embodiments of the invention.

In this example, computing device 100 includes volatile memory 120. Volatile memory 120 may be implemented using DRAM or any other suitable memory components. A startup sequence performed by computing device 100 involves creating state information within volatile memory 120 that allows computing device 100 to perform computing operations as are known in the art.

In this example, that state information is depicted as having two portions, user state information 130 and system state information 140. System state information 140 represents the state information that generically configures computing device 100 for operation by any user. In contrast, user state information 130 represents state information that may be generated when computing device 100 is operated or configured for operation by a specific user.

System state information 140 and user state information 130 may be created in volatile memory 120 according to a startup process as is known in the art. FIG. 1 illustrates, in simplified conceptual fashion, steps in a conventional startup sequence. Such a sequence may be initiated, for example, when computing device 100 is powered on or other command signifying a startup is provided.

Computing device 100 may include components as are known in the art. Those components may include a processor 110. Processor 110 may be implemented as a microprocessor or a collection of microprocessors or processor cores, as are known in the art. The operations described herein may be the result of processor 110 executing software instructions.

Additionally, computing device 100 may incorporate multiple types of computer storage media. In this case, those types include volatile memory and non-volatile memory. In this example, volatile memory 120 is illustrated. Various types of information are stored in non-volatile memory 150 and 152. Boot memory 154 is also non-volatile memory. Different physical devices may be used to implement non-volatile memories 150 and 152 and boot memory 154. For example, non-volatile memory 150 may be a disk, such as a spinning hard disk or a solid state drive. Non-volatile memory 152 may similarly be a disk, and may be the same disk used to implement non-volatile memory 150, a different partition on the same disk or a different disk entirely.

Non-volatile memory 154 may likewise be a portion of the same device used to implement non-volatile memories 150 and 152. Though, in the embodiment illustrated, non-volatile memory 154 may be a non-volatile memory chip connected to processor 110. Accordingly, it should be appreciated that FIG. 1 represents just one example of a memory architecture, and any suitable memory architecture may be used.

In this example, non-volatile and volatile memories are illustrated. Such a configuration represents a traditional computer architecture. Though, it is not a requirement that this specific architecture be used. Rather, volatile memory 120 is an example of operating memory. During operation of computing device 100, processor 110 may predominantly access the software and data to perform operations from volatile memory 120. This memory may be relatively high speed such that operations may be performed by processor 110 quickly.

In contrast, non-volatile memories, such as non-volatile memory 150 and 152, may be capable of storing large quantities of data, but may operate more slowly than volatile memory 120. Generally, the cost of storing information in such non-volatile memories may be relatively small in comparison to the cost of storing information in volatile memory 120. To achieve cost effective, yet high speed operation, information may be transferred between non-volatile memories and the volatile memories. These transfers are performed to create a state within volatile memory 120 that supports desired operation of computing device 100.

Other components of a computer system may be present, but are omitted for simplicity. More detail of components that may be present in other embodiments is provided below in connection with FIG. 8. However, the simplified illustration in FIG. 1 is adequate for an explanation of a startup process.

In response to a startup command, processor 110 may access and execute instructions in boot memory 154. Boot memory 154 may contain instructions that cause processor 110 to access non-volatile memories 150 and 152 and, based on software and data stored in those memories, generate an appropriate state in volatile memory 120.

The instructions in boot memory 154 may cause processor 110 to load software from non-volatile memory 150. As part of loading software components, processor 110 may transfer software instructions to volatile memory 120 from which that software may be executed. Though, loading software may include other operations, including execution of some components.

Execution of some components from volatile memory 120 may transform the software from the state in which it is stored to the state in which it is used or cause other components to be transferred from non-volatile memory to volatile memory 120. In the process of loading software, processor 110 may configure the software based on data stored in non-volatile memory 152 or other information. That information may include, for example, information about hardware components installed in computing device 100. Accordingly, FIG. 1 illustrates that a second and third steps of the startup process may be to acquire software from non-volatile memory 150 and data from non-volatile memory 152.

The first software loaded in this process may establish system state 140. The software initially loaded may add to the system state 140 drivers 146, which control hardware components. Before loading a driver, hardware components associated with computing device 100 may be identified and an appropriate driver may be selected. Once the driver is installed, operating system services, and other components, may interact with the device controlled through the driver.

Operating system services 142 may then be loaded. One example of such a service is file manager 144. File manager 144 may organize data in volatile memory such that executing operating system services and applications may access data in non-volatile memory organized according to files.

Other services provided by an operating system may include interacting with a user interface, establishing a network connection or sending information to a printer. Though, the specific operating system services 142 is not a limitation on the invention.

Additionally, during the process of establishing the system state 140, processor 110 may store system state data 148. Such data may be copied from non-volatile memory, such as non-volatile memory 152, or may he generated by execution of software components. The data, for example, may be generated when processor 110 executes instructions that discover devices installed within computing device 100. As a specific example, upon discovering a specific network interface card, processor 110 may record as part of system state data 148 a type or capabilities of the network interface card. This data may then be used during operation of the computing device to control interactions with the network interface card. Though, it should be appreciated that the specific data stored as system state data 148 is not critical to the invention.

Regardless of the specific operating system services 142 and system state data 148 that is created in system state information 140, when that system state information 140 is created, computing device 100 may be ready for operation by a user. Accordingly, the startup sequence may continue with a process sometimes referred to as user log on. As part of user log on, a specific user may be identified and further state information may be created in volatile memory 120 to allow computing device 100 to perform operations for that user. In this example, user state information 130 is illustrated as containing application instructions 132 and user state data 134.

As with the instructions representing operation system components and the data representing system state, application instructions 132 may be loaded into memory based on software stored on volatile memory 150. Though, the process of loading software may entail executing functions that appropriately configure the software or computing device for operation. That configuration may be dependent on system state data 148 or user state data 134.

As just one example, upon loading application instructions implementing a web browser, processor 110 may access information representing user data, either from non-volatile memory 152 or user state data 134, that identifies specific web sites that a user has identified as "favorites." In this example, establishing user state data 130 configures the web browser for execution in accordance with user preferences, which will include presenting the list of the favorites customized for a specific user that has logged on to computing device 100.

Once user log on is completed, the user may then interact with the computing device 100. These interactions may result in more software being loaded or some loaded applications being closed. Additionally, user interactions may set parameters or take other actions that can change either user state 130 or system state 140. These interactions may continue until a user inputs a command indicating an intent to end the session.

The session may be ended in one of multiple ways. For example, when a user completes a session of interaction with computing device 100, the user may log off and/or shutdown computing device 100. Logoff results in the user session being broken down such that user state information 130 is no longer available in memory 120. Part of the log off sequence may entail removing user specific settings from the system state 140. In this way, a second user may log on to computing device 100 without being influenced by or being able to access state information generated by a prior user. The operations to achieve this result may sometimes be described as breaking down a user session.

System state 140 may be retained following a logoff because power to memory 120 may be maintained. In contrast, shutdown may result in both user state 130 and system state 140 being removed from volatile memory 120. Because power is turned off to volatile memory 120, any information in volatile memory 120 at the end of the shutdown sequence will be lost. Accordingly, any information needed to re-create that state, if not already stored in no-volatile memory, may be moved to non-volatile memory.

Log off and/or shutdown sequences are not necessarily the reverse of the startup sequence because there is no need to return any information generated from non-volatile memories. That same information can be generated again upon subsequent startup. However, portions of the user state 130 that were dynamically generated during the session and cannot be re-created from the information in non-volatile memory, may, as part of the log off or shutdown operation, be recorded in non-volatile memory. Similarly, upon shutdown, portions of the system state data 148 that cannot be re-created upon re-execution of the startup sequence may be transferred to non-volatile memory as part of the shutdown sequence.

As one example, system state data 148 may contain a cache, intended to act as a working copy of data items stored in non-volatile memory 152. A cache speeds up operation of computing device 100 by establishing in volatile memory a copy of information that should be retained in non-volatile memory. Reading or writing information in a faster volatile memory location speeds up operation of the computing device in comparison to accessing that same data in non-volatile memory.

When a copy of data in volatile memory is changed, it no longer matches the corresponding data in non-volatile memory. The data in the cache is said to be "dirty." To keep the non-volatile memory synchronized with the copy in the cache, dirty data is copied, from time-to-time, into non-volatile memory. Usually, dirty data is copied back when the computer is not otherwise busy.

Though, delaying the copying of dirty data creates the possibility that at shut down the data in the cache will not match what is in non-volatile memory. To avoid inconsistencies, prior to shutting down computing device 100, an operation, sometimes referred to as a flushing dirty data, may be performed. During this operation, dirty data is copied to non-volatile storage.

Though the startup sequence illustrated in FIG. 1 is desirable because it configures computing device 100 for operation by a user, the startup sequence can, in some instances, be a source of frustration. An operating system and applications desired by a user may collectively contain thousands or tens of thousands of components. The startup sequence, therefore, may entail multiple read operations from non-volatile memories 150 and 152. Because these memories generally operate slowly, the overall process may be relatively slow. Additionally, a startup sequence may entail time consuming operations other than storage-related operations. Additionally time may be spent, for example, on computations by the CPU or device initialization.

Figure 2:
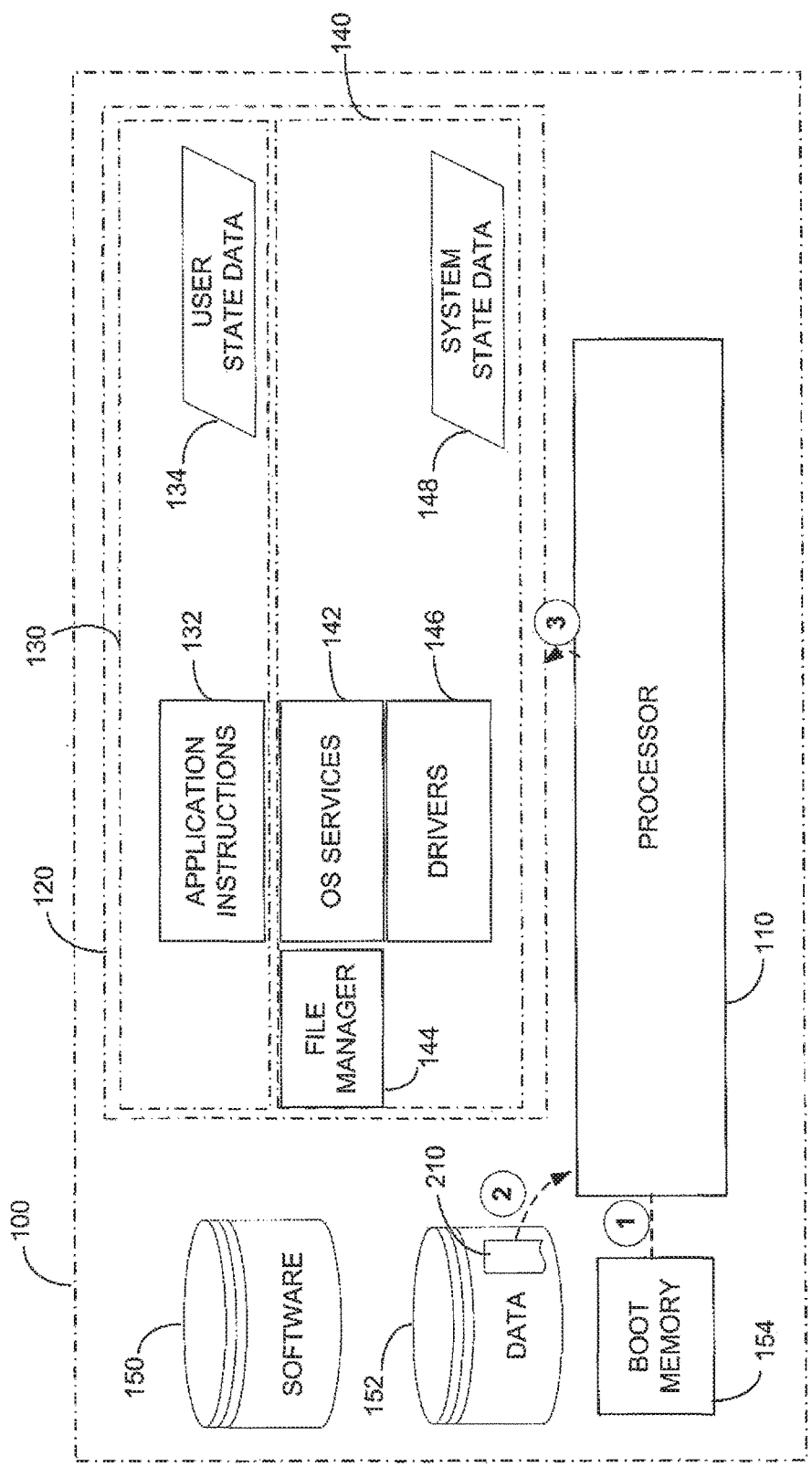
FIG. 2 is a functional block diagram illustrating a resume from hibernation sequence in a computing device.

FIG. 2 illustrates an alternative approach for creating state information in volatile memory. FIG. 2 illustrates computing device 100 during a sequence of operation in which state information is created in volatile memory 120 as part of a resume from hibernation sequence.

Hibernation is an operating mode that may be created by copying skate information from volatile memory to non-volatile memory. Such state information may be organized any suitable way. In the embodiment illustrated in FIG. 2, that state information is illustrated as being stored in hibernation file 210 in non-volatile memory 152. During hibernation, processor 110 may copy state information, including user state information 130 and system state information 140, into hibernation file 210. Hibernation mode is then entered by shutting off power to all or a portion of the components of computer system 100. When the power is shut off, state information in volatile memory 120 is lost. However, it may be re-created as a resume from hibernation by copying the hibernation file into volatile memory.

Accordingly, FIG. 2 shows that the resume from hibernation sequence may begin similarly to the startup sequence illustrated in FIG. 1 by processor 110 accessing instructions stored in boot memory 154. Those instructions cause processor 110 to check for the presence of hibernation file 210. In this example, upon detecting hibernation file 210, processor 110 copies the contents of hibernation file 210 into volatile memory 120. The copying may entail direct copying or may entail processing to transform the information in some way as it is copied, such as decompressing the file. Regardless of whether processing is performed as part of the processing, the end result will result in restoring state information. Once the state information is restored, a user may resume a computing session that was interrupted at the time of hibernation. Both system state data 148 and user state data 134 will be returned to volatile memory 120. Additionally, applications 132, operating system services 142 and drivers 146 will likewise be returned to volatile memory 120 and ready for execution.

Frequently, a resume from hibernation will be faster than performing the full startup sequence illustrated in connection with FIG. 1. Though the same amount of information may ultimately be placed into volatile memory 120 during a resume from hibernation and a full startup, simply copying that information from a file may be faster than generating it by loading software and configuration data.

However, entering hibernation mode and then resuming from hibernation is not always a suitable substitute for performing a shut down and then a startup sequence. The Applicants have recognized and appreciated that performing a hibernation in response to a user command to shut down a computing device and subsequently resuming from hibernation in response to a command from a user to startup a computing device may not result in operation of the computing device that meets the user's expectation.

Figure 3:
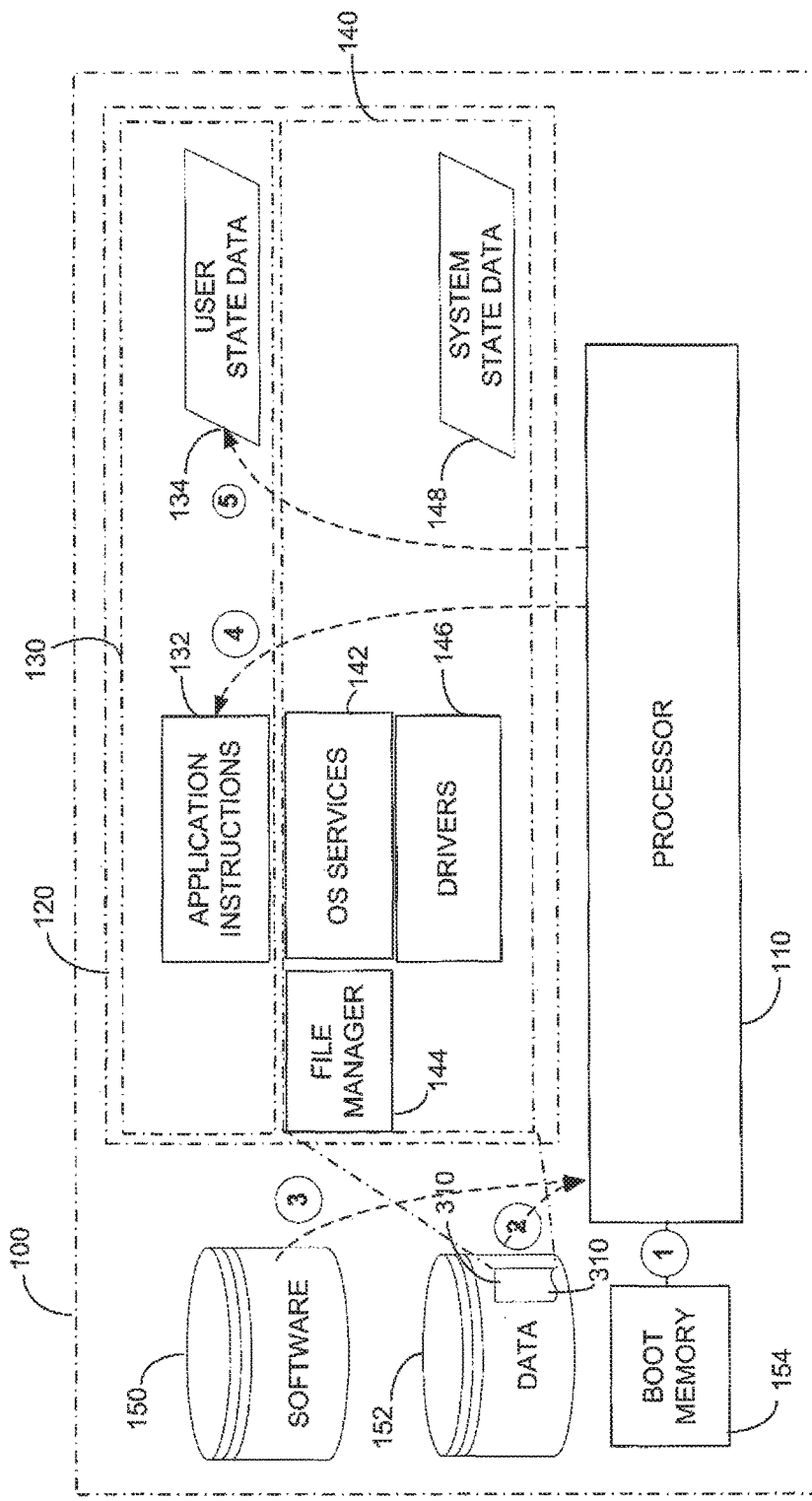
FIG. 3 is a functional block diagram illustrating a fast startup sequence according to some embodiments of the invention.

The inventors have identified a way to provide a faster operating experience, without disrupting existing user expectations. FIG. 3 illustrates a functional block diagram in which computing device 100 may conditionally incorporate hibernation into a shut down sequence. Additionally, the computing device may conditionally incorporate a resume from hibernation in a startup sequence.

In the embodiment illustrated in FIG. 3, computing device 100 is shown to contain state information copied into non-volatile memory 152. In this embodiment, the state information is formatted as a hibernation file 310. Hibernation file 310 may be in the form of a hibernation file as is known in the art. Though it should be appreciated that any suitable format may be used to store state information in non-volatile memory.

In contrast to the information stored in hibernation file 210, hibernation file 310 contains system state 140. User state 130 need not be stored as part of hibernation file 310; though is some embodiments, portions of the user state may be stored. Accordingly, when a user supplies a startup command to computing device 100, processor 110 may begin executing instructions from boot memory 154, similar to what occurs in the operating mode illustrated in FIG. 2. Upon detecting the presence of hibernation file 310, processor 110 may copy the contents of hibernation file 310 into volatile memory 120. This copying re-creates the system state 140 in volatile memory 120.

This state may mimic the state of computing device 100 during the startup sequence illustrated in FIG. 1 after operating system software is loaded, but before a user log on occurs. Accordingly, to complete the creation of state information in volatile memory 120, processor 110 may perform steps of the startup sequence described above in connection with FIG. 1 that occur after system state is created. In this case, those operations may include loading application instructions 132 and creating user state data 134 by reading software instructions from non-volatile memory 150 and configuring it based on data in non-volatile memory 152. Upon completion of these sequence of operations, the state information in volatile memory 120 may be comparable to that loaded as a result of executing the startup sequence as described above in connection with FIG. 1. However, the time required to respond to a startup command using the sequence illustrated in FIG. 3 may be shorter than that required to execute a startup sequence as described in connection with FIG. 1.

In the example illustrated FIG. 3, hibernation file 310, though of the same format as hibernation file 210 (FIG. 2), contains different information. Additionally, hibernation file 310 is created in a different way than hibernation file 210. As described above, hibernation file 210 (FIG. 2) records the state of computing device 100 as represented in volatile memory 120 at the time of a hibernation command. In contrast, hibernation file 310 is created in response to a shut down command. Though, the state information captured in hibernation file 310 does not represent the full state of computing device 100 at the time of the shut down command.

Rather some processing may be performed to place computing device 100 in a target state, at which time the hibernation file 310 may be created. In the embodiment illustrated, the target state represents a state that may have been generated upon loading of an operating system but without a user logging on to computing device 100. Such a target state may be created, at least in part, by executing a portion of the shut down sequence. For example, that portion may include logging off a user or users of computing device 100 or otherwise breaking down user connections. Such processing may be performed using techniques as are known in the art.

Other processing may alternatively or additionally be performed for place computing device 100 in a target state. For example, processing may include flushing dirty data from system state data 148.

Figure 4:
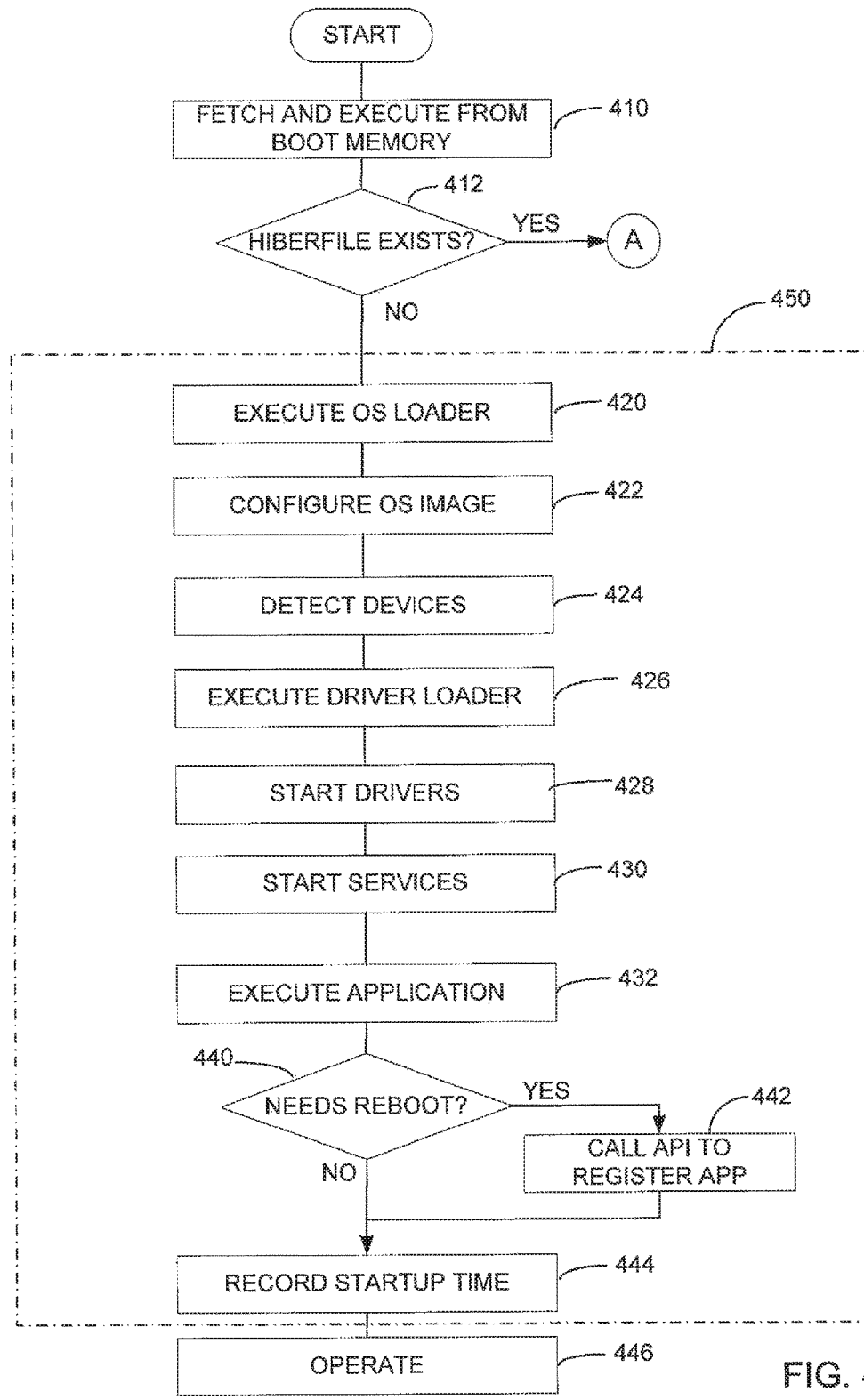
FIG. 4 is a flow chart illustrating a method of operating a computer to respond to a startup command according to some embodiments of the invention.
Figure 5:
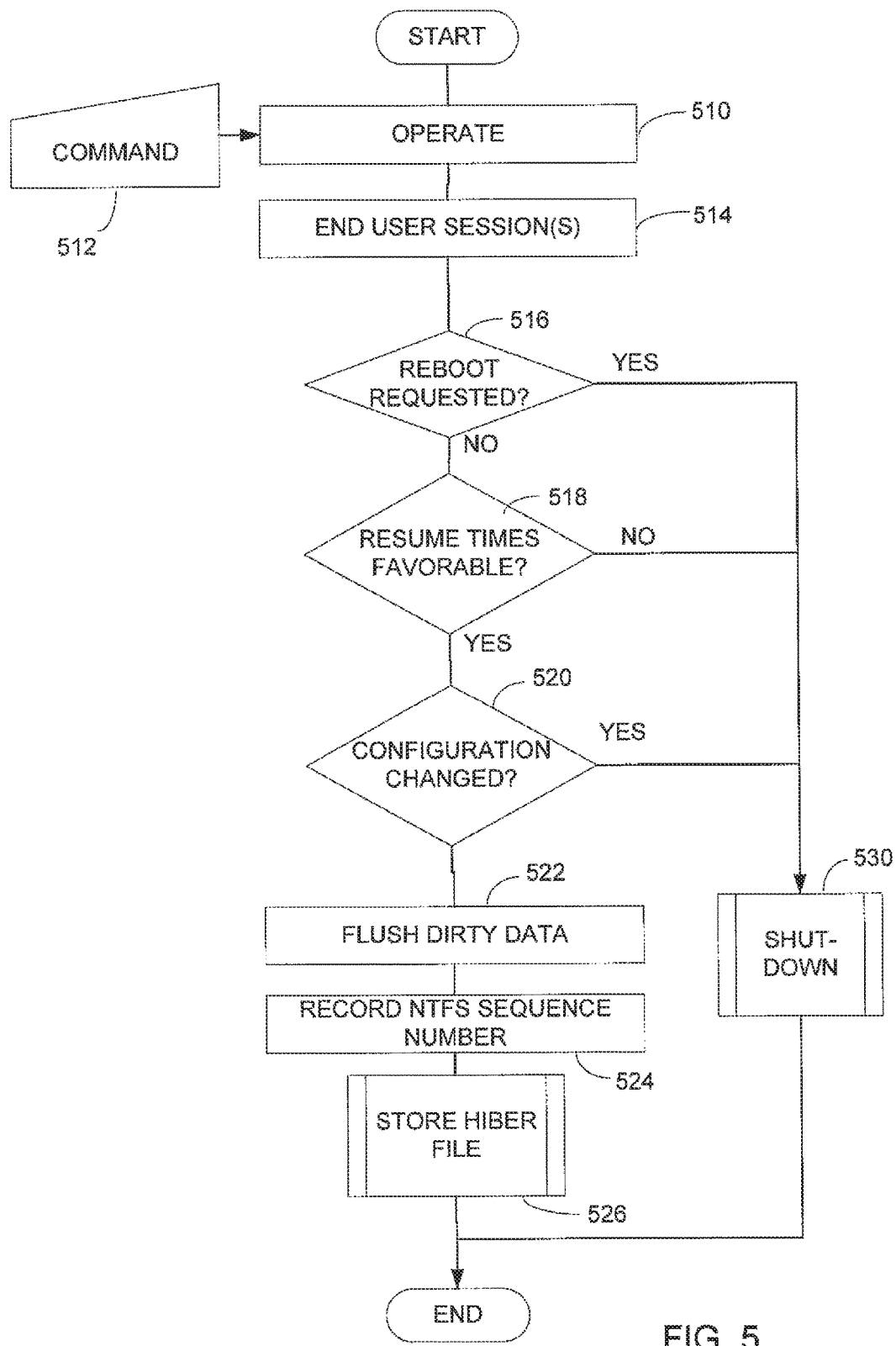
FIG. 5 is a flow chart of a method of operating a computing device to respond to a shutdown command according to some embodiments of the invention.
Figure 6:
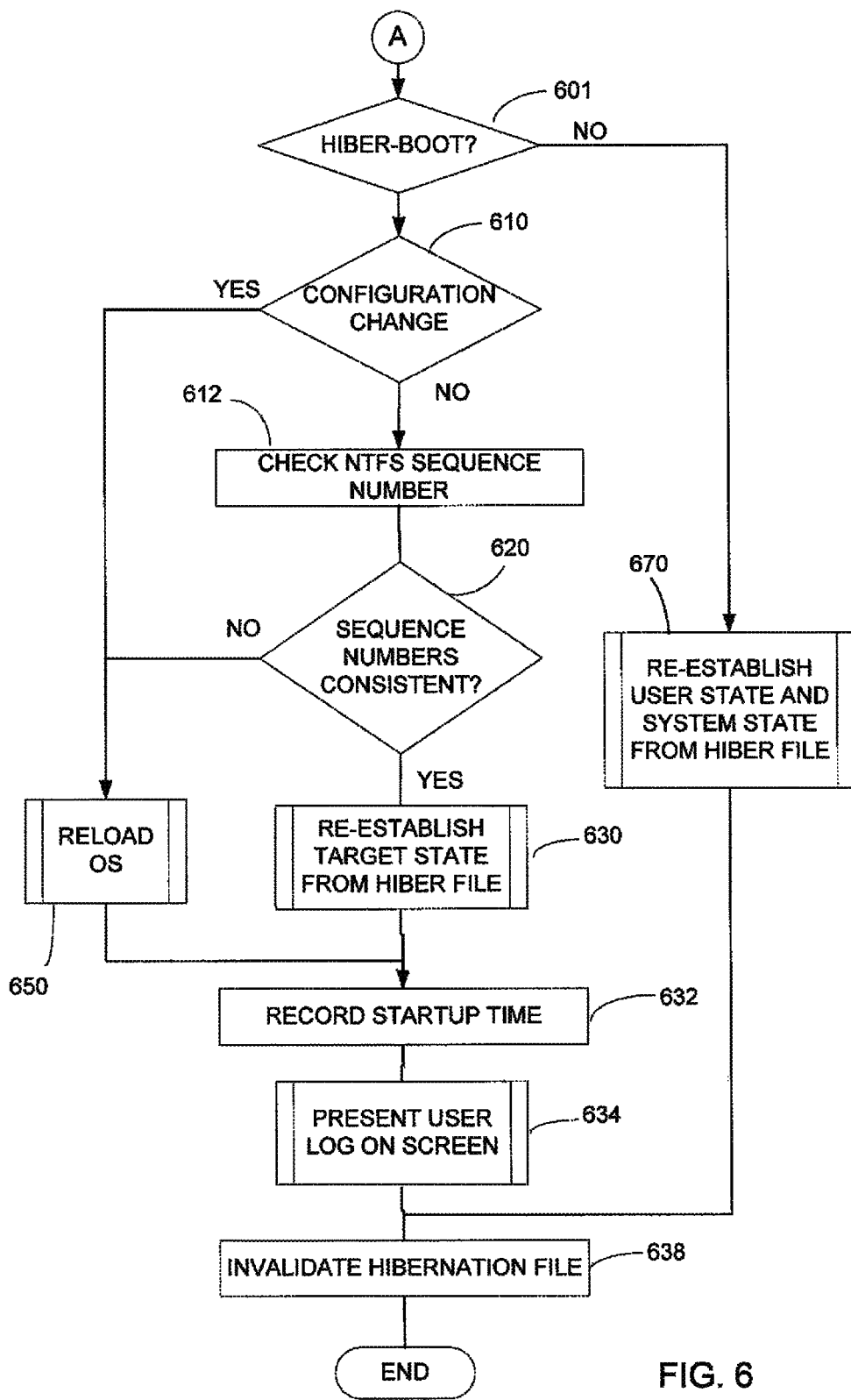
FIG. 6 is a flow chart of a portion of a startup sequence that may be conditionally executed according to some embodiments of the invention.

Moreover, as noted above, to preserve a user expectation of the reaction of computing device 100 to a shut down command, a shut down sequence involving hibernation may be conditionally performed based on conditions that may exist at the time. Similarly, a startup sequence may conditionally involve a resume from hibernation. FIGS. 4, 5 and 6 illustrate such conditional processing.

FIG. 4 illustrates a startup sequence such as may be performed by computing device 100 in response to a startup command. A startup command may, for example, by provided to computing device 100 by a user pressing an on button, supplying power to computing device 100 or otherwise initiating operation of computing device 100.

Regardless of the manner in which the startup sequence is initiated, the process may begin at block 410. At block 410, processor 110 may fetch and execute instructions from boot memory 154 that initiate the process. Though, in later steps of the process, instructions may be fetched from non-volatile memory 150 or from any other suitable source, including from over a network connection.

Regardless of the source of the instructions used to control processor 110 to initiate the startup sequence, the process may branch at decision block 412, depending on whether a hibernation file is detected in non-volatile memory 152. If so, the process may branch to termination point A, to continue on with a process as illustrated in FIG. 6. Conversely, if no hibernation file exists, the process may proceed to subprocess 450.

Subprocess 450 may represent a sequence of operations that implement a startup sequence generally as is known in the art. In this example, the processing at blocks 420, 422, 424, 426, 428, 430 and 432 may represent processing as in a known startup sequence. Though, it should be appreciated that any suitable sequence of operations, using any suitable techniques, may be used.

Regardless of the specific approach used, processing within subprocess 450 may begin at block 420. At block 420, processor 110 executes an operating system loader. Such a loader may be a software component that, when executed, loads components of an operating system from non-volatile memory 150 to volatile memory 120.

At block 422 operations that configure the image of the operating system being created as part of the system state 140 may be configured. This configuration may involve any suitable processing, including setting values of parameters of components loaded into volatile memory or executing instructions that configure other aspects of the system state 140.

Also as part of the startup subprocess 450, computing device 100 may detect devices. Any suitable devices may be detected, such as printers, network interfaces or other peripherals connected to computing device 100. Based on the detected devices, a driver loader may be executed at block 426. A driver loader may be a software component, constructed using known techniques, that loads a driver. Execution of driver loader may involve identifying and loading driver software for the detected devices. Once the drivers have been loaded, they may be started at block 428. This processing may make the drivers and the devices that they control available for use by other components loaded on computing device 100.

The process may continue to block 430 where operating system services may be started. Once the devices and services of the operating system are available for use, processing may proceed to block 432. At block 432 application components may be loaded. This processing may be performed at part of a user log on process, using techniques as are known in the art, or in any other suitable way.

As application components are loaded, the process illustrated in FIG. 4 may branch depending on the nature of the application component loaded at block 432. Branching at decision block 444 allows for the computing device to ameliorate problems that might occur if one or more application components does not operate properly when computing device 100 performs a shutdown sequence using hibernation rather than a conventional shutdown sequence. Some components may require a reboot, meaning that a full startup sequence is performed when the computing device is next powered on such that state will be re-created using a loading process.

As an example, an application component that performs operations differently depending on the time at which computing device 100 starts up may not perform as expected by a user if a shutdown sequence incorporating hibernation as illustrated in FIG. 3 is performed. For those components, when a subsequent startup is performed, if that startup is performed based on a restore from hibernation, the application component may be configured based on state information restored from hibernation file 310. That state information may contain an indication of a time when the computer last performed a full startup sequence. Accordingly, the application component being configured upon loading based on that state information will not be configured with a time value representing when the startup sequence illustrated in FIG. 4 was initiated.

In contrast with possible user expectations, that component will be configured with a time value representing a prior time when the full startup sequence was performed. In this case, behavior of the application component will be based on a time that differs from a user expectation because the user would expect the application component to be configured based on the time that which the process of FIG. 4 began.

Accordingly, when such an application component is loaded on computing device 100, it may be desirable to determine that the component requires a full shutdown sequence in response to a shutdown command from a user. When such a component is executing, the computing device may respond to a shutdown command by performing a full shutdown sequence. In this way, upon a subsequence receipt of a startup command, no hibernation file will be available, and a full startup sequence, as illustrated, for example, in FIG. 1, will be performed. At other times, the computing device may respond to a shutdown command with a shutdown sequence incorporating hibernation as illustrated in FIG. 3.

To support such behavior consistent with user expectation, a mechanism may be provided for an application program to designate that it requires a full shutdown and full startup sequence to be performed. In the example of FIG. 4, that mechanism may be implemented through an application programming interface (API) supported by the operating system of computing device 100. Even application components that do not, in all instances, require a full shutdown and full startup sequence may place a call through such an API.

Accordingly, if it is determined at block 440 that an application component being loaded requires a reboot, processing may branch to block 442. At block 442, the application programming interface may be called to register that application component. In this example, the API allows the operating system to track whether the application component requesting a reboot is still executing when a startup command is subsequently received. Though, it should be appreciated that such a call may be made at any time. Any component, for example, that is reconfigured or otherwise encounters an operating state in which it determines a full shutdown and full startup sequence be performed may make a call through the API.

If no such call is made through the API, when a shutdown command is subsequently received, the operating system may determine that a shutdown sequence, incorporating hibernation as illustrated in FIG. 3, may be used. Conversely, if a call has been made through the API to signify a full shut down and full startup sequence are requested, the operating system may perform a full shutdown sequence, without creating a hibernation file such that, upon subsequent receipt of a startup command, a full startup sequence may be performed.

Any suitable mechanism may be used to determine whether an application component needs a reboot, involving a full shutdown and subsequent full startup sequence. As one example, the application component may be programmed to call the API indicated at block 442. Alternatively, the operating system may contain computer executable instructions to analyze application components as they are being loaded to identify functions that may require a reboot. In that scenario, processing at decision block 440 may involve analyzing each application component as it is loaded. Though, any suitable techniques may be used at decision block 440 to determine whether a reboot may be needed based on application components loaded.

Though FIG. 4 illustrates determining whether a reboot is needed based on application components loaded, similar processing may be performed for other elements of computing device 100. For example, similar processing may be performed for operating system components. Alternatively or additionally, similar processing may be performed based on devices installed in computing device 100 or to which computing device 100 is connected.

Regardless of the conditions identified at decision block 440 that may indicate a need for a reboot, if those conditions are identified, processing may branch to block 442 where an indication is stored. That indication may trigger a full shutdown in response to a shutdown command from a user or, alternatively or additionally, may trigger a full startup sequence in response to a user command to startup, even if a hibernation file is available. If those conditions are not detected, processing may proceed to block 444.

At block 444, data may be collected to allow computing device 100 to determine the effectiveness of using a startup sequence that incorporates hibernation. In this example, processing at block 444 records the time to perform subprocess 450, which in this example indicates execution of a full startup sequence. This information may be recorded in any suitable way. For example, information on startup time may be recorded in non-volatile memory 152. The information may be recorded as individual startup times, indicating a time required to perform a full startup sequence each time such a full startup sequence is performed. Alternatively, the information may be recorded as a running average over multiple full startup sequences, or in any other suitable way.

Information on startup time may be determined in any suitable way at block 444. As one example, a timer may be started at the initiation of subprocess 450 and read when processing reaches block 444. Though, other time measurement techniques are known and may be applied at block 444.

Once the startup time is recorded, processing may proceed to block 446. Here, conventional operation of computing device 100 may occur. Such operation may continue until a shutdown command is received.

FIG. 5 illustrates processing that may be performed in response to such a shutdown command. The process illustrated in FIG. 5 includes a block 510, representing operation of computing device 100 using techniques as are known in the art. During operation, a shutdown command 512 may be received. Shutdown command 512 may be generated by user input in any suitable way, such as through graphical user interface or a hardware control.

Figure 7:
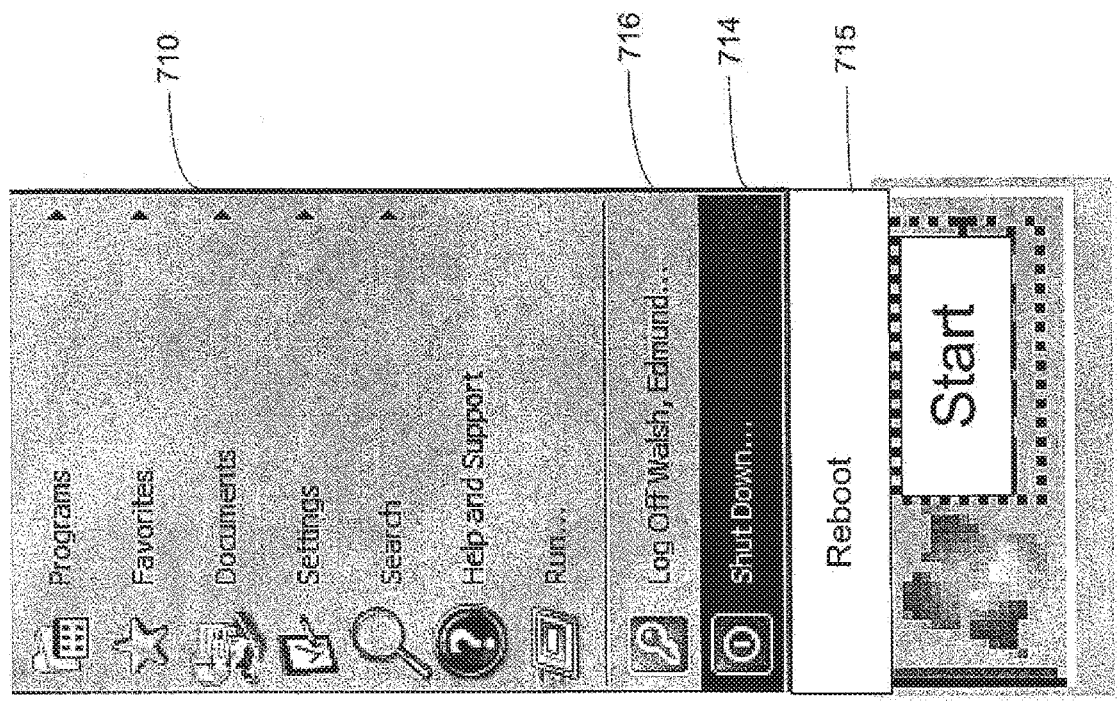
FIG. 7 is a sketch of a portion of a graphical user interface through which a user may select between commands that cause different behaviors of a computing device upon shutdown.

In some embodiments, computing device 100 may support multiple types of user input that can trigger a shutdown sequence. FIG. 7 is an illustration of a graphical user interface through which a user may input shutdown commands. In this example, the graphical user interface 710 is invoked by pressing a button labeled "start" that appears on a user interface presented by a computer operating system. Though, it should be appreciated that different operating systems support different interfaces and any suitable technique to invoke a user interface may be used.

In response to pressing that button, graphical user interface 710 may be presented by an operating system, using techniques as are known in the art. Through graphical user interface 710, a user of computing device 100 may select among multiple possible commands for ending a current session on the computing device. Here, three options are shown.

Command 714 is here labeled "shutdown." Such a shutdown command is conventional on many computing devices and has traditionally been used to indicate that the computing device should perform a full shutdown sequence. However, in the embodiment illustrated in FIG. 5, user selection of shutdown command 714 may result in the operating system of computing device 100 determining whether a partial shutdown sequence incorporating hibernation may instead be performed. In this embodiment, an operating system uses a label for a command having semantic meaning to a user in a way that is potentially inconsistent with that meaning. Nonetheless, the conditional processing preserves user expectations.

Though, if a user wants to ensure that a shutdown sequence is performed, a separate command, with a different label may be supplied for that reason. If a user desires to instruct the computing device to perform a full shutdown, without creating a hibernation file such that, upon a subsequent startup command, the operating system state will be generated by loading software from non-volatile memory 150 and configuring it with data from non-volatile memory 152, the user may select command 715. In this example, command 715 is labeled "reboot." Such a labeling is used to identify to a user that a full shutdown sequence will be performed such that, upon a subsequent startup command, a full startup sequence will be performed. In this case, command 715 performs actions that are similar to those performed in a conventional computing system when a "shutdown" command is issued. However, in the computing device presenting graphical user interface 710, the semantic label associated with a traditional shutdown command has been applied to command 714. Accordingly, command 715 is given a different label.

Graphical user interface 710 may also contain other options for ending a user session. In this example, graphical user interface 710 includes a command 716. Upon selection of command 716, computing device 100 may respond by breaking down a session for a designated user. Such behavior of a computing device is known in the art. In this case, command 716 may correspond to a conventional logoff command. Though, many suitable command options may be included in graphical user interface 710, in the embodiment illustrated, only selection of command 714 or 716 results in initiation of the process illustrated in FIG. 5.

Regardless of the manner in which the shutdown command is received and its nature, in response to receipt of the command, processing may transition from block 510 to block 514. At block 514, the beginning portions of a shutdown sequence may be performed. The portion of the shutdown sequence performed at block 514 may involve conventional processing. In this example, the processing at block 514 ends any user session or sessions on computing device 100. As described above in connection with FIG. 1, such processing may involve closing applications and saving user state data 134 or performing any other suitable actions. As a result of those actions, any information in user state 130 that is persisted from one user session to the next is moved from user state data 134 to non-volatile memory, such as non-volatile memory 152.

Regardless of the specific steps taken to end user sessions or otherwise persist user state data 134, when those steps are completed, processing my proceed to decision block 516. At decision block 516, the process of FIG. 5 may branch depending on whether a reboot has been requested. Processing at block 516 may be performed in any suitable way. Any one or more criteria may be applied at decision block 516 to determine whether a reboot has been requested. As one example, user input may be used at decision block 516 to determine whether a reboot has been requested. For example, when a user selects reboot command 715 (FIG. 7), that user selection may serve as an indication that a reboot has been requested.

As another example, it was described in connection with FIG. 4 that an application component may request a reboot, such as by calling an API at block 442 (FIG. 4). If such a call has been made, processing at decision block 516 may determine that a reboot has been requested. Though in some embodiments, the processing at decision block 516 may be conditioned on multiple criteria. For example, processing may determine that an application component has registered a request for a reboot through a call to an API at block 442. Further processing at decision block 516 may determine whether such a request should be honored. Such processing may include, for example, determining whether the requesting application component is still executing at the time the process of FIG. 5 is executed. Alternatively or additionally, processing at decision block 516 may entail determining whether the requesting component has sufficient access privileges to command a reboot.

Regardless of the nature of the processing performed at decision block 516, if, as a result of that processing, it is determined that a reboot has been requested, the process branches to block 530. In this scenario, block 530 represents a full shutdown sequence. Such a full shutdown sequence may be performed as is known in the art. It may entail breaking down user sessions, flushing dirty data and powering off the computing device. Regardless of the specific steps taken performing the shutdown sequence, upon completion, the process of FIG. 5 may end, leaving computing device 100 in a powered off state.

Conversely, if a reboot has not been requested at decision block 516, the process may proceed to decision block 518. Processing at decision block 518 is an example of conditional processing to determine whether a full shutdown sequence should be performed or a partial shutdown, followed by hibernation should be performed. Generally, processing at decision block 518 may entail application of any suitable policy. Such a policy may be evaluated at the time a shutdown command is received.

In the example illustrated, the policy applied relates to time savings achieved using hibernation. At decision block 518, it may be determined whether a time savings is achieved by starting up from hibernation. Such a determination may be made by comparing recorded information about relative times for placing computing device 100 in an operation state with a full startup sequence or a resume from hibernation followed by a partial startup sequence. Information on a time for performing a full startup may be based, for example, on information stored at block 444 (FIG. 4). Information on the time required to place computing device 100 in an operational state following a resume from hibernation may be determined in a similar way based on information recorded at the end of execution of the process of FIG. 6.

If the times for creating an operating state based on a resume followed by a partial startup are slower than times for performing a full startup, the processing may branch from decision block 518 to subprocess 530. Conversely, if processing at decision block 518 determines that a resume from hibernation followed by partial execution of a startup sequence is preferable, processing may proceed to decision block 520.

At decision block 520, further conditional processing may be performed to determine whether the computing device 100 is in a state appropriate for a partial shutdown sequence incorporating hibernation. Such processing may entail determining whether, during the current session, configuration changes were specified for any components. If such configuration changes require a reboot to become effective, a shutdown involving hibernation may not implement user expectation for the behavior of computing device 100 because selecting the shutdown command 714 (FIG. 7) is associated with a label that traditionally would cause the computing device to apply configuration changes at the next startup.

If computing device 100 implements a shutdown sequence involving hibernation in response to a command with a label traditionally used to indicate a full startup, upon a subsequent startup, the state of those components will resume their previous state rather than a state based on configuration changes Accordingly, a scenario may exist in which user expectations of invoking a command that might otherwise be associated with a full shutdown sequence will not exhibit expected behaviors. To avoid computing device 100 operating in a way inconsistent with expected user behaviors, the process of FIG. 5 may branch depending on whether the computing device automatically determines that a full shutdown sequence should be performed in order to obtain operation consistent with user expectations. If so, the process branches to subprocess 530, where a full shutdown sequence is performed as described above.

In the embodiment illustrated, a condition under which a full shutdown sequence is to be performed is identified by determining whether any components have had configuration settings changed during the current session. Techniques as are known in the art for making this determination my be applied at decision block 520. As one example, processing to change configuration settings of executing components may entail setting a flag or otherwise recording an indication of a configuration change. In that scenario, processing at decision block 520 may entail checking the value of the status flag. Though, other suitable processing alternatively or additionally may be used. For example, processing may entail scanning one or more memory locations to detect unapplied configuration settings.

Regardless of how the determination is made at decision block 520, if no condition exists under which a full shut down and/or subsequent full startup is required, processing may proceed to decision block 522. At block 522, operations to fully place computing device 100 in a target state from which hibernation occurs are performed. As described above in connection with FIG. 3, that target state may correspond to a state in which the operating system state is maintained but all user sessions have been broken down and any user state that is required upon subsequent logon of the user has been persisted, in an appropriate form, in non-volatile memory.

An example of an operation that may be performed to achieve this target state is flushing dirty data. Alternatively or additionally, if other data stored as part of system state data 148 relates to a session of a logged on user, processing at block 522 may entail storing that data in non-volatile memory 152.

Regardless of what operations are performed to fully achieve the target state, processing may then proceed to block 524. Block 524, information that later may be used to ascertain the suitability of a hibernation file for recreating a target state on computing device 100 may be taken. As an example, some computing devices may be configured with multiple operating systems or multiple instances of an operating system. A hibernation file created as part of shut down of a specific instance of an operating system may be used to restore operating system state only in response to a command to startup the same instance of the operating system.

However, the possibility that a computing device may be operated with an operating system other than the one in use when the hibernation file was created creates a possibility that an operating system will be executing on the computing device between the time when a hibernation file was created and a subsequent startup command that would trigger re-creation of state based on that file. Intervening operation by another operating system or instance of the same operating system may create the possibility that the state captured in the hibernation file no longer represents the state of the computing device that should be created in order to achieve operation consistent with user expectations.

For example, if a user has, after shutting down operation with a first operating system, loaded a second operating system and made changes to any data or other component used by the first operating system, resuming from a hibernation file in this instance will result in creating astute that does not reflect the intervening user changes.

Accordingly, a mechanism may be employed to determine whether, upon a subsequent startup command, a hibernation file is suitable for use in recreating the operating state of computing device 100. In the embodiment illustrated in FIG. 5, that mechanism entails storing information at the time the hibernation file is created. In this specific example, that information is a sequence number maintained by a file system. Specifically, the sequence number may be maintained by the NTFS file system or other file system that may be operating on a computing device. Such a sequence number may be incremented each time at volume of disk storage is loaded. Accordingly, processing at block 524 may entail storing the NTFS sequence number associated with the volume containing the hibernation file and other data associated with the operating system. This value may be stored in non-volatile memory such that it may be accessed in connection with a subsequent startup command.

Regardless of the specific information recorded at block 524 to allow a subsequent determination of the usability of a hibernation file, the process may proceed to subprocess 526. Subprocess 526 may involve storing the hibernation file. Processing at block 526 may be performed using conventional techniques associated with hibernation of a computing device. Though, it should be appreciated that any suitable technique performing a hibernation file may be used.

Regardless of the specific technique used to store the hibernation file as part of subprocess 526, upon storing the hibernation file, power may be shut down to computing device 100. Computing device 100 may stay in the powered down state until a startup command is received.

The subsequent startup command may be processed as illustrated in FIG. 4 and FIG. 6. FIG. 4 illustrates processing that may be performed in response to receiving a start command. That processing includes processing at block 410 and at decision block 412. When processing reaches decision block 412, the process may branch, depending on whether a hibernation file exists, such as may exist if subprocess 526 was performed during the immediately preceding shutdown. When that hibernation file exists, the process of FIG. 4 may branch through the connector labeled A to continue with processing as illustrated in FIG. 6.

Processing at FIG. 6 illustrates a process that may be performed when a hibernation file exists. The process of FIG. 6 may begin at block 601. At block 601, the process may branch depending on whether the hibernation file detected at decision block 412 (FIG. 4) represents a hibernation file capturing a target state during a shut down such as is indicated in connection with subprocess 526. If it does, the process may proceed to decision block 610.

Alternatively, the hibernation file may represent a conventional hibernation file incorporating user state in addition to system state information. Such a hibernation file may be used in accordance with a conventional technique to restore that state. The convention processing may be performed at subprocess 670 where the hibernation file is used to reestablish a state of the computing device, including user state, at the time of the prior hibernation. Following completion of subprocess 670, processing may continue to block 638.

Conversely, if the hibernation file, as determined at decision block 601 was recorded as part of a shutdown process, the process continues to decision block 610. Beginning at decision block 610, one or more operations may be performed to determine whether, in response to the startup command, a full startup sequence should be performed or a resume from hibernation followed by a partial startup sequence should be performed. In this example, multiple conditions are checked to determine whether a resume from hibernation should be performed even though it is determined that a hibernation file exists. One such condition checked at decision block 610 entails determining whether, for the computing device 100, there has been a change in hardware configuration such that a resume from a hibernation may result in re-creating state information that does not match the current computer configuration. Such a change may be detected in any suitable way, including checking an inventory of hardware components that was created during a last session of the computing device and stored in non-volatile memory. The hardware configuration of the computing device upon subsequent startup can be check to ensure that each item on the inventor is installed. Though, it should be appreciated that checking an inventory is only one example of how such processing may be performed. Regardless of how the determination is made, f the hardware configuration has changed, the processing may branch from decision block 610 to subprocess 650. Subprocess 650 may entail reloading the operating system. Processing at subprocess 650 may be performed using techniques as are known in the art. Following loading of the operating system in subprocess 650, the process may proceed to block 632.

Conversely, if processing at decision block 610 determines that no hardware configuration occurred, processing may proceed to block 612. At block 612, further processing may be performed to dynamically determine whether computing device 100 is in a state from which a resume from hibernation is to be performed. In this case, processing at decision block 612 may make use of information stored at block 524 (FIG. 5) to determine whether changes that occurred between the creation of the hibernation file such that user expectations would not be met if a resume from hibernation were performed.

In this example, processing at block 612 involves checking the NTFS sequence number associated with the volume containing the hibernation file. If that volume has not been loaded since the hibernation file was created, the sequence number read at block 612 will differ from the sequence number stored at block 524 by a known amount representing a chance in the sequence number upon startup. Conversely, if the difference in sequence numbers is greater than the known amount, processing at block 612 will identify that changes possibly were made between the time of the creation of the hibernation file and the startup command that triggered the resume from hibernation.

At decision block 620, the process may branch based on the comparison performed at block 612. If the sequence numbers are not consistent, the process branches to subprocess 750. Such a branch may occur when a difference in the sequence numbers indicates that the hibernation file may not establish an operating state of the computing device that is consistent with user expectations. Accordingly, subprocess 650 is performed in which the system state 140 is created by reloading operating system software.

Conversely, if the comparison performed at block 612 indicates that the sequence numbers are consistent, the process may proceed to subprocess 630. When that branch is taken, the hibernation file has been determined to be appropriate for reestablishing the state of the computing device. Accordingly, subprocess 630 entails reestablishing the target state of the computing device from the hibernation file. Subprocess 630 may be performed using known techniques for resuming from hibernation. Though, in this scenario, rather than reestablishing a state of the computing device including a user state, resuming based on the hibernation file re-creates the target state at the time the hibernation file was created. This state for example may represent the state of the computing device at the start of subprocess 526 (FIG. 5). Though, in other embodiments, partial user state may be stored in the hibernation file, such as may occur when the operating system predicts applications likely to be opened by a user upon completion of a startup sequence and stores the hibernation file to capture the state of the computing device while those applications are still open.

Upon completion of subprocess 630, the process of FIG. 6 may proceed to block 632. Regardless of whether processing arrives at block 632 through subprocess 630 or 650, at block 632 a time required to respond to a startup command may be recorded. The meaning of the value recorded may depend on the path by which processing reached block 632. When processing arrives at block 632 through subprocess 630, the time represents the time for startup using a resume from hibernation as part of the processing, and is recorded accordingly. Conversely, when processing arrives at block 632 through subprocess 650, the time represents the time for startup using a full startup sequence, and is recorded accordingly. Processing at block 632 may be performed at any suitable way, including using techniques as describe in connection with block 444 (FIG. 4).

As a result of recording information at block 632, processing at decision block 518 (FIG. 5) may have information available to compare the time to respond to a startup command based on a full startup sequence that includes a resume from hibernation and a position of the startup sequence. This information may be recorded and compared in any suitable way.

Processing may then proceed to subprocess 634. At subprocess 634, a portion of a startup sequence may be performed to create a desired operating state for the computing device. This portion may include logging on a user. This operation may be performed in a known way and may include automated log on or may include presenting a log on screen through which a user may present information to manually perform a log on process. In scenarios in which processing arrived at subprocess 634 through subprocess 650, the combination of processing at subprocess 650 and subprocess 634 may represent a full startup sequence. Conversely, if processing arrives at subprocess 634 through subprocess 630, the response to the startup command involves a resume from hibernation and a portion of the startup sequence.

In this example, that portion of the startup sequence represents logging on a user in subprocess 634. Such processing may be performed using conventional techniques. Though, the specific steps used to complete the startup sequence following a resume from hibernation may be any suitable techniques.

The process may then proceed to block 638, where the hibernation file may be invalidated. Processing may also arrive at block 638 following subprocess 670. Regardless of how processing arrives at block 638, The hibernation file may be invalidated in any suitable way that indicates that the hibernation file is not to be later used when it might re-create an incorrect operating state. The hibernation file may be invalidated, for example, by altering its contents in some way, recording in a separate memory structure that the file is invalid or by deleting the file.

The process of FIG. 6 may then end. When the process ends, computing device 100 may be configured in an operating state and may thereafter continue operating until a shutdown or reboot command is received.

Figure 8:
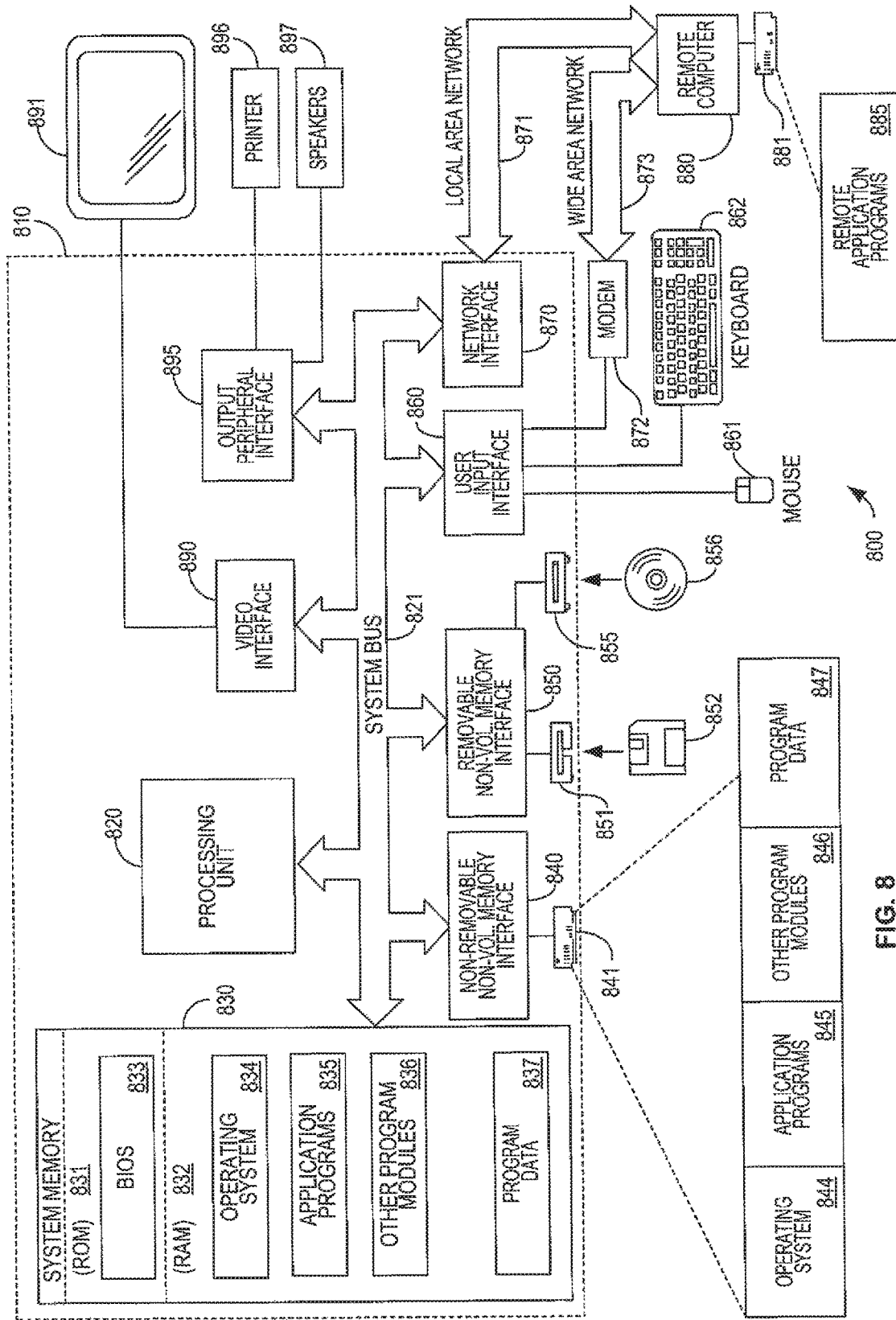
FIG. 8 is a block diagram of an exemplary computing device, illustrating an environment in which embodiments of the invention may operation.

FIG. 8 illustrates an example of a suitable computing system environment 800 on which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 my also include other removable/non-removable, volatile/nonvolatile computer storage media. By way of example only, FIG. 8 illustrates a hard disk drive 840 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Hard disk drive 840 may be implemented as a spinning magnetic medium that contains one or more magnetic heads that can write to or read from the magnetic media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, it is described that a determination is made upon startup of whether to perform a full startup sequence or a resume from hibernation followed by a portion of a startup sequence based on relative times observed for performing each sequence. It should be appreciated that similar processing could be performed at shutdown. If performed at shutdown, the decision could be implemented by storing or not storing a hibernation file. Accordingly, it should be appreciated that operations described as occurring upon startup may alternatively be performed upon shutdown, and vice versa.

Benefits as described above may be achieved in other ways. For example, in addition to avoiding work by a computer's CPU and other components, such as a disk, during a process of setting up state, such an approach allows data to be saved in a hibernation file in response to a shutdown command that will help speed up a user's experience during a response to a subsequent startup command and/or after processing of the startup command has been completed. For example, when the user logs on, a number of applications may be launched (e.g. WINDOWS EXPLORER web browser, startup apps, etc). An operating system may explicitly track files (and their offsets) that a user accesses during a defined interval after processing of a startup command is completed. Those applications, or other components, can be read into memory to be saved into the hibernation filed created during a subsequent processing of a shutdown command. In this way, these applications, or other components, will be read sequentially from disk into memory instead of having to read it randomly as part of launching those applications.

Also, user log on and log off is described. It should be appreciated that a shutdown command may be provided in scenarios on which multiple users are logged onto a computer. If a shutdown sequence is partially performed and then a hibernation operation is performed, the partial shutdown sequence may result in log off of multiple users, but techniques as described above may nonetheless be applied.

For example, techniques as described herein may be used to provide automated servicing without user intervention. For example, a computing device that has responded to a shutdown command by performing a partial shutdown sequence and then hibernating, may be configured to automatically wake at a time when user activity is not expected, such as in the middle of the night. Upon awaking, the computing device may perform maintenance activities, such as applying software updates. To the user, it appears as if the computing device was shutdown at the end of the day, such that the maintenance activities are transparent to the user. Such a capability may be implemented, for example, if the computing device, in response to a shutdown command, detects that it has maintenance activity or patches to apply and arms itself to wake at an opportune time. When it wakes up, the computing device performs whatever maintenance activity, such as applying patches, is necessary. The system then does a full restart and then again performs a partial shutdown followed by a hibernation. This scenario enables a software vendor to offer a solution that makes maintenance activity invisible to the user. This capability can be applied to both consumers and to enterprise PCs. In addition to improving the user experience, such an approach may also save power, particularly for enterprise users.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may he shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a computing device, the method comprising:
   detecting, by the computing device during a startup process of the computing device, a hibernation file that was created during a preceding shutdown process of the computing device, where the detected hibernation file stores a system state and first hardware configuration of the computing device as existing on the computing device at a first time of the preceding shutdown process;
   determining, by the computing device, that a second hardware configuration of the computing device at a second time of the startup process remains compatible with the first hardware configuration of the computing device at the first time of the preceding shutdown process; and
   restoring, by and to the computing device in response to the determining that the second hardware configuration of the computing device remains compatible with the first hardware configuration of the computing device, the system state of the computing device stored in the detected hibernation file, where the system state being restored is a part of the startup process of the computing device.

2. The method of claim 1 further comprising second determining, based on a sequence number associated with a volume on which the detected hibernation file is stored, that the volume has not been loaded since the detected hibernation file was created, the restoring further in response to the second determining that the volume has not been loaded since the detected hibernation file was created.

3. The method of claim 1 where the detected hibernation file stores the system state of the computing device but does not store any user state of any users of the computing device.

4. The method of claim 1 where the determining that the second hardware configuration of the computing device remains compatible with the first hardware configuration of the computing device comprises checking a hardware inventory of the computing device.

5. The method of claim 1 where the detected hibernation file further stores at least a partial user state of a user of the computing device.

6. The method of claim 1 where the restoring further comprises logging a user on to the computing device as another part of the startup process of the computing device.

7. The method of claim 1 where the restoring further comprises invalidating the detected hibernation file.

8. At least one computer storage device that comprises computer executable instructions that, based on execution by a computing device, configure the computing device to perform actions comprising:
   detecting, by the computing device during a startup process of the computing device, a hibernation file that was created during a preceding shutdown process of the computing device, where the detected hibernation file stores a system state and first hardware configuration of the computing device as existing on the computing device at a first time of the preceding shutdown process;

determining, by the computing device, that a second hardware configuration of the computing device at a second time of the startup process remains compatible with the first hardware configuration of the computing device at the first time of the preceding shutdown process; and restoring, by and to the computing device in response to the determining that the second hardware configuration of the computing device remains compatible with the first hardware configuration of the computing device, the system state of the computing device stored in the detected hibernation file, where the system state being restored is a part of the startup process of the computing device.

9. The at least one computer storage device of claim 8, the actions further comprising second determining, based on a sequence number associated with a volume on which the detected hibernation file is stored, that the volume has not been loaded since the detected hibernation file was created, the restoring further in response to the second determining that the volume has not been loaded since the detected hibernation file was created.

10. The at least one computer storage device of claim 8 where the detected hibernation file stores the system state of the computing device but does not store any user state of any users of the computing device.

11. The at least one computer storage device of claim 8 where the determining that the second hardware configuration of the computing device remains compatible with the first hardware configuration of the computing device comprises checking a hardware inventory of the computing device.

12. The at least one computer storage device of claim 8 where the detected hibernation file further stores at least a partial user state of a user of the computing device.

13. The at least one computer storage device of claim 8 where the restoring further comprises logging a user on to the computing device as another part of the startup process of the computing device.

14. The at least one computer storage device of claim 8 where the restoring further comprises invalidating the detected hibernation file.

15. A computing device comprising;
a processor;
memory that is coupled to the processor and that comprises at least one program module according to which the computing device is configured to:

detect, during a startup process of the computing device, a hibernation file that was created during a preceding shutdown process of the computing device, where the detected hibernation file stores a system state and first hardware configuration of the computing device as existing on the computing device at a first time of the preceding shutdown process;

determine that a second hardware configuration of the computing device at a second time of the startup process remains compatible with the first hardware configuration of the computing device at the first time of the preceding shutdown process; and restore, to the computing device in response to determining that the second hardware configuration of the computing device remains compatible with the first hardware configuration of the computing device, the system state of the computing device stored in the detected hibernation file, where the system state being restored is a part of the startup process of the computing device.

16. The computing device of claim 15 further configured to second determine, based on a sequence number associated with a volume on which the detected hibernation file is stored, that the volume has not been loaded since the detected hibernation file was created, and where the system state being restored is further in response to determining that the volume has not been loaded since the detected hibernation file was created.

17. The computing device of claim 15 where the detected hibernation file stores the system state of the computing device but does not store any user state of any users of the computing device.

18. The computing device of claim 15 where it is determined that the second hardware configuration of the computing device remains compatible with the first hardware configuration of the computing device based at least in part on checking a hardware inventory of the computing device.

19. The computing device of claim 15 where the detected hibernation file further stores at least a partial user state of a user of the computing device.

20. The computing device of claim 15 further configured to, as part of the system state being restored, log a user on to the computing device or invalidate the detected hibernation file.

* * * * *